Patented Nov. 14, 1939

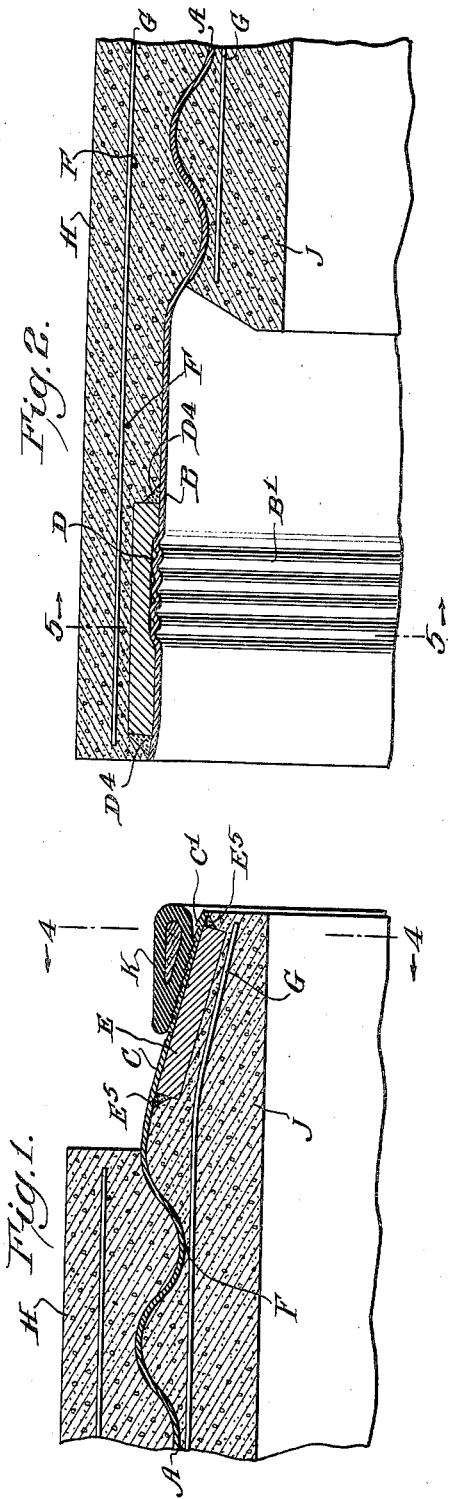
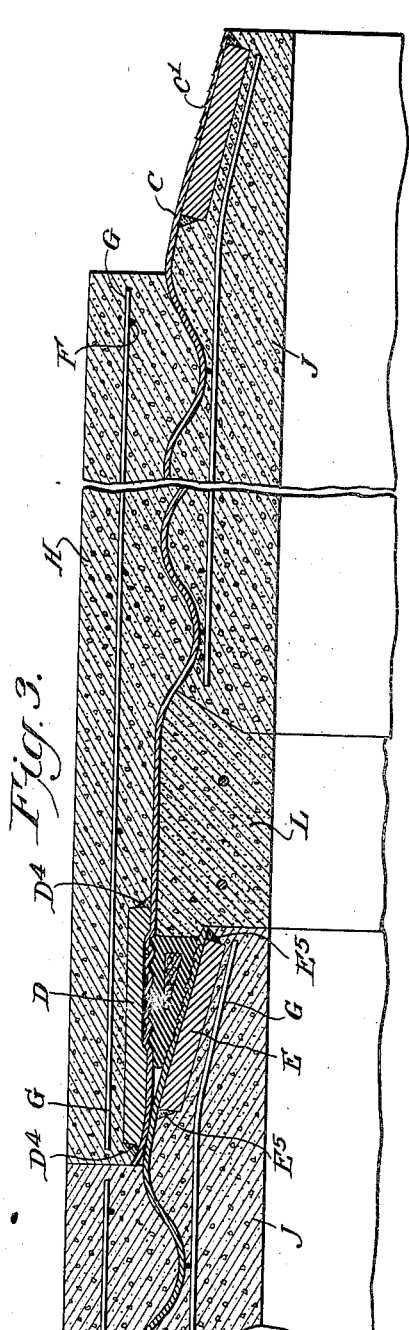

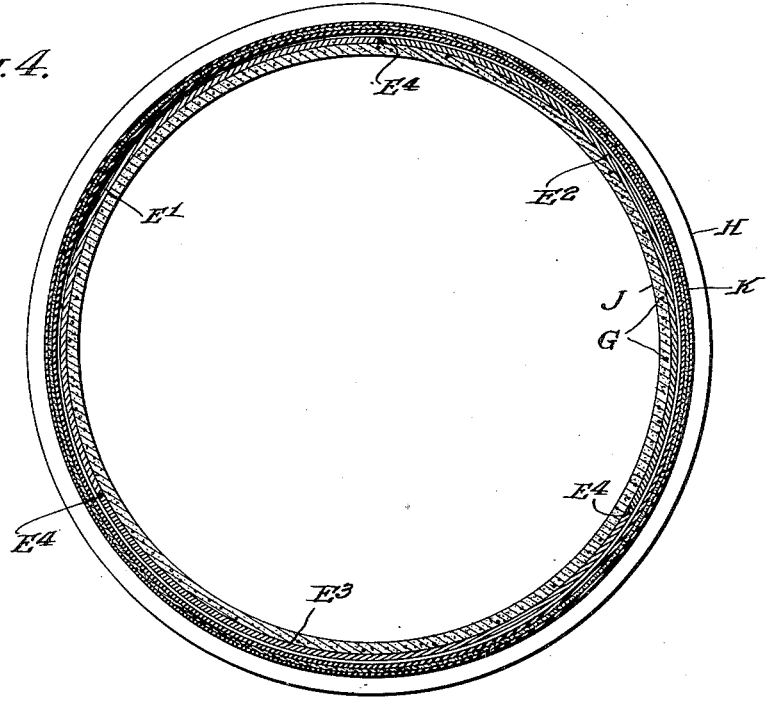
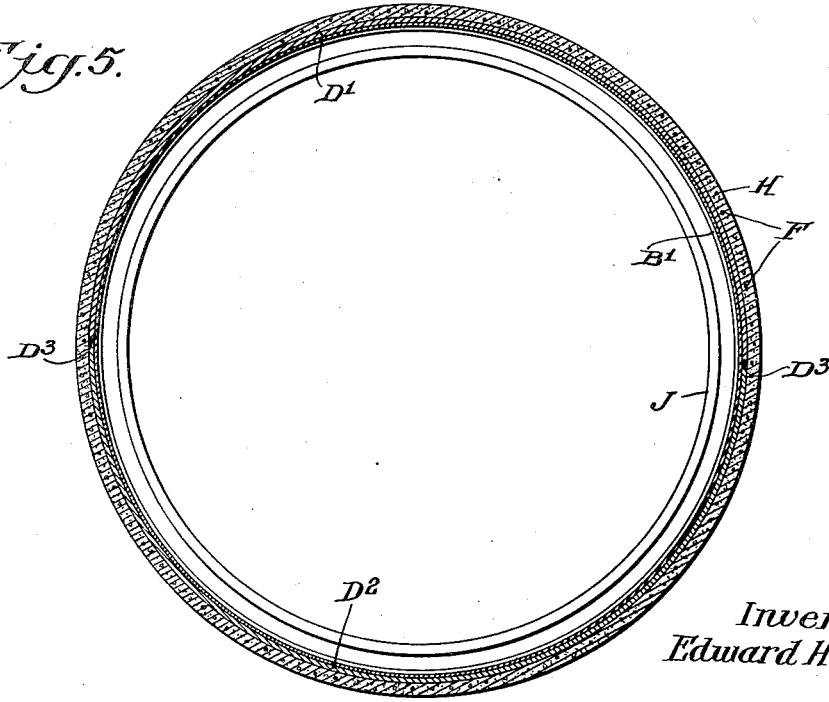

2,179,629

UNITED STATES PATENT OFFICE 2,179,629

REINFORCED CONCRETE PIPE

Edward Hering, Beverly, N. J., assignor to United States Pipe and Foundry Company, Burlington, N. J., a corporation of New Jersey Application February 15, 1938, Serial No. 190,561

3 Claims. (Cl. 138—85)

My invention relates to reinforced concrete pipes of the type in which a relatively thin walled steel tube extends through the body of the pipe and between internal and external layers of concrete and, particularly, my invention relates to pipes of this character of such large diameter as to permit of joints between the bell and spigot ends of coupled pipes being caulked from the inside of the pipe. Owing to the thinness of the reinforcing tube and the necessity that the joint formed between the bell and spigot ends of coupled pipes should be able to withstand caulking and other strains to which such joints are exposed, it has been the general practice to form the bell and spigot ends of the pipe of thicker metal than the reinforcing tube extending through the body of the pipe and unite the bell and spigot to the ends of the reinforcing tube by circumferential welding. The pipes constructed in this way have not proved entirely satisfactory, among other reasons because the circumferential welding does not always result in a water tight joint and it is a prime object of my invention to provide a pipe structure of the general character above referred to in which the bell and spigot ends of the pipe shall be formed of the same relatively thin metal tube which extends through the body of the pipe, said bell and spigot ends being reinforced in the portion subject to caulking strains by protective metallic rings extending over such portions of the thin reinforcing tube and separating such portions from the layer of concrete which would otherwise contact therewith and, generally speaking, my invention consists in forming the bell and spigot ends of the pipe of continuations of the relatively thin reinforcement of the body of the pipe, strengthening the bell end thus formed against caulking and other strains tending to deform it by a reinforcing and protective ring welded to the outside of the portion of the bell which is to be subjected to caulking strains and by welding to the portion of the inside of the spigot end which is to be subjected to caulking strains another reinforcing and protective metal ring, the reinforced bell being overlaid by a continuation of the outer layer of concrete of the pipe and the reinforced spigot being underlaid by a continuation of the inner concrete layer of the pipe.

I preferentially circumferentially flute a portion of the bell against which the packing is to be caulked and, preferentially, I also taper the spigot end so as to form a progressively enlarged packing chamber between it and the bell of a coupled pipe and where, by reason of these constructive features or others which may make it impracticable to use continuous reinforcing and protective rings in the asembling of the pipe structure, I form the reinforcing and protective rings of longitudinal segments which, when assembled with the bell and spigot to form rings, I unite to each other to form continuous rings by welding and secure them to the bell and spigot, also by welding.

For a better understanding of my improved pipe structure, reference is had to the drawings in which Figure 1 is a longitudinal section through one side of the spigot end of my improved pipe.

Figure 2 is a similar longitudinal section through one side of the bell end of my improved pipe.

Figure 3 is a longitudinal section through one side of the coupled and caulked bell and spigot ends of similar pipes.

Figure 4 is a cross-section on a very much smaller scale on the line 4—4 of Fig. 1, and Figure 5 is a cross-sectional view taken on the line 5—5 of Fig. 2.

It should be understood that the external diameter of the pipe, of which portions are shown in the drawings, is approximately forty-two inches and the inside diameter is approximately thirty-six inches and that the diameter of the end of the tapered spigot is approximately thirty-eight inches and from these figures the relative proportional size of the illustrated portions of the pipe can be readily estimated.

A is a relatively thin walled metallic tube extending through the length of the pipe and forming at one end the bell B and at the other end the spigot C, adapted to form bell and spigot joints with similarly constructed pipes, said bell and spigot being formed as integral extensions of the pipe A and of the same wall thickness as said intermediate portions. As shown, the intermediate portion of the reinforcing pipe A is circumferentially fluted and the portion of the bell B, against which packing is to be caulked, is fluted, as indicated at $B^1$, to form retaining grooves for the packing; as shown also, the outer end of the bell, the body of which is, as shown, approximately cylindrical, is formed with a slight outward taper. As shown, also, the spigot end C is tapered from a diameter approximating that of the bell so that on entry into the bell of a similar pipe it will form with said bell a progressively enlarging packing chamber, but the spigot is much shorter than the bell so that when fully inserted there is ample room at the base of the bell for the insertion of packing and the use of a caulking tool operated from the inside of the pipe line. As shown, the portion of the spigot which in the asembled joint lies opposite to the fluted portion of the bell B¹, is formed with serrations, as indicated at C¹. D is a reinforcing and protective ring fitting over the portion of the bell in which the flutings are formed and so formed at its ends as to contact with the bell on both sides of the flutings. The intermediate portion of the reinforcing ring D should contact, as shown, with the outer portion of the flutings and, most conveniently, this reinforcing ring D is made in two sections, as indicated at D¹ and D² fitted togeher over the fluted portion of the bell, as shown, and welded to each other, as indicated at D³, and to the bell, as indicated at D⁴. E is a reinforcing and protective ring located in the spigot and extending over the portion of the spigot which is to be subjected to caulking strains and where, as in the illustrated construction, it is not practicable to insert a reinforcing ring as a whole in the spigot, it is formed in longitudinal segments, as indicated at E¹, E² and E³ as indicated in Fig. 4, said segments, when fitted in the spigot, being welded together, as indicated at E⁴ and to the spigot, as indicated at E⁵.

In addition to the reinforcing tube A, my improved pipe, as illustrated, incorporates in its body portion circumferential reinforcing rods, indicated at F, and longitudinal reinforcing rods, indicated at G, and the pipe is further made of an outer layer of concrete, indicated at H, which extends over the reinforced bell but not over the spigot and an inner layer of concrete, indicated at J, which extends over the inside of the reinforced spigot but not over its outside. K indicates a packing gasket of lead formed over an oakum center which in assembling the joint is preferably placed on the spigot, as indicated in Fig. 1, and then inserted in the bell of a similar pipe, the packing gasket extending over the serrations C¹ on the spigot and contacting with the flutings B¹ of the bell. The pipes being coupled, the operator, using a caulking tool, caulks the lead gasket in place, forcing it against the serrated portion C¹ of the spigot and into the fluted portions B¹ of the bell and, by preference, the joint is then completed by filling the space at the butt end of the bell, as indicated at L.

Having now described my invention, what I claim as new and desire to secure by Letters Patent, is:

1. In a reinforced concrete pipe incorporating a relatively thin steel tube extending through the body of the pipe between inner and outer layers of concrete and forming at one end a bell and at the other end of the pipe a spigot, said bell and spigot ends being so formed as, when interengaged with similar pipes, to provide a caulking space between metallic surfaces on the bell and spigot, the improvement which consists in securing an end portion of each thin metallic tube to a relatively heavy metallic ring embedded in the concrete on the side opposite the caulking surfaces for preventing strain, arising from the caulking process, from being transferred to the concrete portion of the pipe.

2. In a reinforced concrete pipe as called for in claim 1, the constructive feature which consists in making up the protective ring of longitudinal segments secured to the thin metallic reinforcing tube and to each other by welding.

3. In a reinforced concrete pipe as called for in claim 1, the further improvement which consists in forming annular corrugations in a portion of the thin reinforcing tube against which caulking is to be packed and in making up the protective ring of longitudinal segments secured to the thin metallic reinforcing tube and to each other by welding.

EDWARD HERING.